US011492515B2

(12) United States Patent
Clapper et al.

(10) Patent No.: US 11,492,515 B2
(45) Date of Patent: *Nov. 8, 2022

(54) LOW DIELECTRIC OPTICALLY CLEAR ADHESIVES FOR FLEXIBLE ELECTRONIC DISPLAY

(71) Applicant: 3M INNOVATIVE PROPERTIES COMPANY, St. Paul, MN (US)

(72) Inventors: Jason D. Clapper, Lino Lakes, MN (US); Ross E. Behling, Woodbury, MN (US); Christopher J. Campbell, Burnsville, MN (US); Albert I. Everaerts, Tucson, AZ (US)

(73) Assignee: 3M Innovative Properties Company, St. Paul, MN (US)

( * ) Notice: Subject to any disclaimer, the term of this patent is extended or adjusted under 35 U.S.C. 154(b) by 683 days.

This patent is subject to a terminal disclaimer.

(21) Appl. No.: 16/464,952

(22) PCT Filed: Nov. 20, 2017

(86) PCT No.: PCT/US2017/062554
§ 371 (c)(1),
(2) Date: May 29, 2019

(87) PCT Pub. No.: WO2018/102179
PCT Pub. Date: Jun. 7, 2018

(65) Prior Publication Data
US 2019/0316004 A1    Oct. 17, 2019

Related U.S. Application Data

(60) Provisional application No. 62/429,306, filed on Dec. 2, 2016.

(51) Int. Cl.
| | | |
|---|---|---|
| *B32B 3/00* | (2006.01) |
| *C09J 4/00* | (2006.01) |
| *B32B 7/12* | (2006.01) |
| *C08F 220/20* | (2006.01) |
| *C08F 220/18* | (2006.01) |
| *B32B 37/12* | (2006.01) |

(52) U.S. Cl.
CPC ............................. *C09J 4/00* (2013.01); *B32B 7/12* (2013.01); *C08F 220/1818* (2020.02); *C08F 220/20* (2013.01); *B32B 2037/1253* (2013.01); *B32B 2305/72* (2013.01); *B32B 2307/204* (2013.01); *B32B 2307/40* (2013.01); *B32B 2457/208* (2013.01); *C08F 220/1809* (2020.02)

(58) Field of Classification Search
CPC . B32B 7/12; B32B 2307/40; B32B 2307/204; B32B 2037/1253; B32B 2305/72; B32B 2457/208; C09J 4/00
See application file for complete search history.

(56) References Cited

U.S. PATENT DOCUMENTS

| | | | |
|---|---|---|---|
| 4,619,979 A | 10/1986 | Kotnour | |
| 4,843,134 A | 6/1989 | Kotnour | |
| 5,637,646 A | 6/1997 | Ellis | |
| 5,804,610 A | 9/1998 | Hamer | |
| 8,137,807 B2 | 3/2012 | Clapper | |
| 9,399,724 B2 | 7/2016 | Lewandowski | |
| 10,640,689 B2 * | 5/2020 | Behling | ............ C08F 220/1818 |
| 2008/0011986 A1 | 1/2008 | Yamakawa | |
| 2010/0086705 A1 | 4/2010 | Everaerts | |
| 2012/0094037 A1 | 4/2012 | Banba | |
| 2013/0323437 A1 | 12/2013 | Banba | |
| 2013/0323521 A1 | 12/2013 | Xia | |
| 2014/0065417 A1 | 3/2014 | Higashi | |
| 2017/0355173 A1 | 12/2017 | Tanaka | |
| 2018/0037775 A1 * | 2/2018 | Wright | ........................ C09J 5/00 |
| 2018/0118980 A1 * | 5/2018 | Robinson | ............ C08G 18/0819 |

FOREIGN PATENT DOCUMENTS

| | | |
|---|---|---|
| CN | 104650750 | 11/2014 |
| CN | 104910837 | 3/2017 |
| JP | 2014-152225 | 8/2014 |
| JP | 2015-016653 | 1/2015 |
| JP | 2015-017207 | 1/2015 |
| JP | 2016047924 A | 4/2016 |
| JP | 2016047924 A2 † | 4/2016 |
| KR | 20130118159 A † | 10/2013 |
| KR | 20130128359 A † | 11/2013 |
| KR | 20160018238 A † | 2/2016 |
| KR | 20160077565 A † | 7/2016 |
| WO | WO 2016-196541 | 12/2016 |
| WO | WO 2017-058499 | 4/2017 |

OTHER PUBLICATIONS

International Search Report for PCT International Application No. PCT/US2017/062554, dated Feb. 6, 2018, 5 pages.

* cited by examiner
† cited by third party

*Primary Examiner* — Elizabeth E Mulvaney

(57) ABSTRACT

The present invention is an assembly layer for a flexible device. The assembly layer is derived from precursors that include about 0 to about 50 wt % $C_1$-$C_9$ alkyl(meth)acrylate, about 40 to about 99 wt % $C_{10}$-$C_{24}$ (meth)acrylate, about 0 to about 30 wt % hydroxyl(meth)acrylate, about 0 to about 10 wt % of a non-hydroxy functional polar monomer, and about 0 to about 5 wt % crosslinker.

17 Claims, No Drawings

LOW DIELECTRIC OPTICALLY CLEAR ADHESIVES FOR FLEXIBLE ELECTRONIC DISPLAY

FIELD OF THE INVENTION

The present invention is related generally to the field of flexible assembly layers. In particular, the present invention is related to flexible assembly layers used in flexible devices, such as flexible or foldable electronic displays and flexible or foldable photovoltaic materials.

BACKGROUND

A common application of pressure-sensitive adhesives in the industry today is in the manufacturing of various displays, such as computer monitors, TVs, cell phones and small displays (in cars, appliances, wearables, electronic equipment, etc.). Flexible electronic displays, where the display can be bent freely without cracking or breaking, is a rapidly emerging technology area for making electronic devices using, for example, flexible plastic substrates. This technology allows integration of electronic functionality into non-planar objects, conformity to desired design, and flexibility during use that can give rise to a multitude of new applications.

With the emergence of flexible electronic displays, there is an increasing demand for adhesives, and particularly for optically clear adhesives (OCA), to serve as an assembly layer or gap filling layer between an outer cover lens or sheet (based on glass, PET, PC, PMMA, polyimide, PEN, cyclic olefin copolymer, etc.) and an underlying display module of electronic display assemblies. The presence of the OCA improves the performance of the display by increasing brightness and contrast, while also providing structural support to the assembly. In a flexible assembly, the OCA will also serve at the assembly layer, which in addition to the typical OCA functions, may also absorb most of the folding induced stress to prevent damage to the fragile components of the display panel and protect the electronic components from breaking under the stress of folding. The OCA layer may also be used to position and retain the neutral bending axis at, or at least near, the fragile components of the display, such as for example the barrier layers, the driving electrodes, or the thin film transistors of an organic light emitting display (OLED).

If used outside of the viewing area of a display or photo-active area of a photovoltaic assembly, it is not necessary that the flexible assembly layer is optically clear. Indeed, such material may still be useful for example as an adhesive for the backside assembly of the display or as a sealant at the periphery of the assembly to allow movement of the substrates while maintaining sufficient adhesion to seal the device.

Typical OCAs are visco-elastic in nature and are meant to provide durability under a range of environmental exposure conditions and high frequency loading. In such cases, a high level of adhesion and some balance of visco-elastic property is maintained to achieve good pressure-sensitive behavior and incorporate damping properties in the OCA. However, these properties are not fully sufficient to enable foldable or durable displays.

Touch sensitivity is an important factor for touch enabled displays. The projective capacitive (PCAP) senses touch by a change in the capacitance at a particular point of the display. The use of OCAs can help improve PCAP touch sensitivity through careful consideration of the dielectric constant.

To determine optimal operation of the touch sensor, the impact of the dielectric constant or permittivity on the capacitance of a finger or stylus in contact with the display ($C_{finger}$) is a significant factor. $C_{finger}$ is defined by:

$$C_{finger} = \frac{\varepsilon_0 \varepsilon_R A}{t} = \frac{\varepsilon_0 A}{T_v}$$

Where $\varepsilon_R$ is the dielectric constant of the material between the finger and the touch electrode (e.g. touch sensor), $\varepsilon_0$ is the vacuum permittivity, A is the touch area, t is the thickness between the electrodes and the finger and $T_v$ is the equivalent vacuum thickness, defined by the thickness between the electrodes and the finger divided by the dielectric constant between the finger and the electrode. In one embodiment, the $\varepsilon_R$ can be additive (e.g. glass+OCA+film touch sensor is on if the touch sensor is on the backside of a film bonded with OCA to a coverglass).

To determine an optimal adhesive for between the touch sensor and the display (behind the sensing circuitry), the parasitic capacitance ($C_P$) should be minimized. The goal is to provide an insulator behind the touch sensor to isolate/minimize noise created by the display and the electronics located behind the display. With a dielectric constant of 1, an air gap can be an ideal insulator in this case. However, to improve optical performance and enable thinner devices, OCAs are often used to bond the touch sensor directly to the display. In this case, an OCA should be chosen to maximize the equivalent vacuum thickness, $T_v$. This can be done through a lower dielectric constant or a thicker adhesive layer. For foldable OLED device constructions, thinner adhesive layers may be preferred, so it would be ideal to have a lower dielectric constant OCA.

Another crucial factor for touch sensitivity is prevention of corrosion on the touch sensor traces. Many touch sensor manufacturers address this issue by passivation of the touch sensor traces with an organic layer that prevents corrosion. To simplify the process and reduce cost, an OCA may be used as the organic layer and be positioned in direct contact with the corrosion sensitive portions of the touch sensor. However, environmental exposure to this organic layer, as well as to the metal flex connections to these traces, can lead to damage to the touch circuitry and a loss in touch sensitivity. To prevent this, an OCA should be chosen that is acid-free and that does not cause oxidation and/or reduction of the materials that it comes in contact with.

Yet another need in the industry is for the OCA to have a relatively stable dielectric constant independent of the environment it is in. For example, large variations in the dielectric constant due to change in environmental humidity may significantly impact the sensitivity of the touch sensor.

Due to the significantly different mechanical requirements for flexible display assemblies, there is a need to develop novel adhesives for application in this new technology area. Along with conventional performance attributes, such as optical clarity, adhesion, and durability, these OCAs need to meet a new challenging set of requirements such as bendability and recoverability without defects and delamination.

SUMMARY

In one embodiment, the present invention is an assembly layer for a flexible device. The assembly layer is derived from precursors that include about 0 to about 50 wt % $C_1$-$C_9$ alkyl(meth)acrylate, about 40 to about 99 wt % $C_{10}$-$C_{24}$ alkyl (meth)acrylate, about 0 to about 30 wt % hydroxyl (meth)acrylate, about 0 to about 10 wt % of a non-hydroxy functional polar monomer, and about 0 to about 5 wt % crosslinker.

In another embodiment, the present invention is a laminate including a first substrate, a second substrate, and an assembly layer positioned between and in contact with the first substrate and the second substrate. The assembly layer is derived from precursors that include about 0 to about 50 wt % $C_1$-$C_9$ alkyl(meth)acrylate, about 40 to about 99 wt % $C_{10}$-$C_{24}$ alkyl (meth)acrylate, about 0 to about 30 wt % hydroxyl (meth)acrylate, about 0 to about 10 wt % of a non-hydroxy functional polar monomer, and about 0 to about 5 wt % crosslinker.

In yet another embodiment, the present invention is a method of adhering a first substrate and a second substrate, wherein both of the first and the second substrates are flexible. The method includes positioning an assembly layer between the first substrate and the second substrate and applying pressure and/or heat to form a laminate. The assembly layer is derived from precursors that include about 0 to about 50 wt % $C_1$-$C_9$ alkyl(meth)acrylate, about 40 to about 99 wt % $C_{10}$-$C_{24}$ alkyl (meth)acrylate, about 0 to about 30 wt % hydroxyl (meth)acrylate, about 0 to about 10 wt % of a non-hydroxy functional polar monomer, and about 0 to about 5 wt % crosslinker.

DETAILED DESCRIPTION

The present invention is an assembly layer usable, for example, in flexible devices, such as electronic displays, flexible photovoltaic cells or solar panels, and wearable electronics. As used herein, the term "assembly layer" refers to a layer that possesses the following properties: (1) adherence to at least two flexible substrates and (2) sufficient ability to hold onto the adherends during repeated flexing to pass the durability testing. As used herein, a "flexible device" is defined as a device that can undergo repeated flexing or roll up action with a bend radius as low as 200 mm, 100 mm, 50 mm, 20 mm, 10 mm, 5 mm, or even less than 2 mm. The assembly layer is soft, is predominantly elastic with good adhesion to plastic films or other flexible substrates like glass, and has high tolerance for dynamic shear loading. In addition, the assembly layer has relatively low modulus, high percent compliance at moderate stress, a low glass transition temperature, generation of minimal peak stress during folding, and good strain recovery after applying and removing stress, making it suitable for use in a flexible assembly because of its ability to withstand repeated folding and unfolding. Under repeated flexing or rolling of a multi-layered construction, the shear loading on the adhesive layers becomes very significant and any form of stress can cause not only mechanical defects (delamination, buckling of one or more layers, cavitation bubbles in the adhesive, etc.) but also optical defects or Mura. Unlike traditional adhesives that are mainly visco-elastic in character, the assembly layer of the present invention is predominantly elastic at use conditions, yet maintains sufficient adhesion to pass a range of durability requirements. In one embodiment, the assembly layer is optically clear and exhibits low haze, high visible light transparency, anti-whitening behavior, and environmental durability.

The assembly layer of the present invention is prepared from select acrylic monomer compositions and cross-linked at different levels to offer a range of elastic properties, while still generally meeting all optically clear requirements. For example, an assembly layer used within a laminate with a folding radius as low as 5 mm or less can be obtained without causing delamination or buckling of the laminate or bubbling of the adhesive. In one embodiment, the acrylic-based assembly layer composition is derived from precursors that include about 0 to about 50 wt % $C_1$-$C_9$ alkyl(meth)acrylate, about 40 to about 99 wt % $C_{10}$-$C_{24}$ alkyl (meth)acrylate, about 0 to about 30 wt % hydroxyl (meth)acrylate, about 0 to about 10 wt % of a non-hydroxy functional polar monomer, and about 0 to about 5 wt % crosslinker.

Examples of suitable alkyl acrylates (i.e., acrylic acid alkyl ester monomers) include, but are not limited to, linear or branched monofunctional acrylates or methacrylates of non-tertiary alkyl alcohols, where the alkyl groups have from 1 to 24 carbon atoms. Examples of suitable monomers include, but are not limited to: 2-ethylhexyl (meth)acrylate, ethyl (meth)acrylate, methyl (meth)acrylate, n-propyl (meth)acrylate, isopropyl (meth)acrylate, pentyl (meth)acrylate, n-octyl (meth)acrylate, isooctyl (meth)acrylate, isononyl (meth)acrylate, n-butyl (meth)acrylate, isobutyl (meth)acrylate, hexyl (meth)acrylate, n-nonyl (meth)acrylate, isoamyl (meth)acrylate, n-decyl (meth)acrylate, isodecyl (meth)acrylate, dodecyl (meth)acrylate, isobornyl (meth)acrylate, cyclohexyl (meth)acrylate, phenyl meth (acrylate), benzyl meth(acrylate), isostearylacrylate and 2-methylbutyl (meth)acrylate, and combinations thereof. Other suitable monomers include branched long chain acrylates such as those described in U.S. Pat. No. 8,137,807, which is hereby incorporated by reference. Additional suitable alkyl monomers include secondary alkyl acrylates such as those described in U.S. Pat. No. 9,399,724, which is hereby incorporated by reference. In one embodiment, the acrylic-based assembly layer includes only alkyl (meth)acrylate monomers with optional vinylester or styrenic monomers. In such cases, the modulus and glass transition temperature (Tg) of the composition can be adjusted by selecting combinations of low and high Tg yielding monomers. In one embodiment, the acrylic-based assembly layer includes between about 0 to about 50 wt % $C_1$-$C_9$ alkyl (meth)acrylate and about 40 to about 100 wt % $C_{10}$-$C_{24}$ alkyl(meth)acrylate.

In some embodiments, the precursor composition includes a hydroxyl (meth)acrylate comonomer. Examples of suitable monomers include, but are not limited to: 2-hydroxyethyl (meth)acrylate, and 2-hydroxy-propyl (meth)acrylate, 4-hydroxybutyl(meth)acrylate, and the like. In one embodiment, the acrylic-based assembly layer includes between about 0 and about 40 parts by weight of the hydroxy functional copolymerizable monomer, particularly between about 5 and about 35 parts, and more particularly between about 15 and about 30 parts.

In some embodiments, the precursor composition includes a non-hydroxy functional polar copolymerizable monomer. Examples of suitable non-hydroxy functional polar copolymerizable monomers include, but are not limited to: acrylic acid (AA), methacrylic acid, itaconic acid, fumaric acid, ether functional monomers such as 2-ethoxyethyl (meth)acrylate, 2-ethoxyethoxyethyl (meth)acrylate, dimethylaminoethyl(meth)acrylate, nitrogen containing monomers such as acrylamide, methacrylamide, N-alkyl substituted and N,N-dialkyl substituted acrylamides or methacrylamides where the alkyl group has up to 3 carbons, and N-vinyl lactams. Examples of suitable substituted amide monomers include, but are not limited to: n,n-dimethylacrylamide, n,n-diethyl acrylamide, N-morpholino (meth)acrylate, N-vinyl pyrolidone and N-vinyl caprolactam. In one embodiment, the acrylic-based assembly layer includes between about 0 and about 10 parts by weight of the polar copolymerizable monomer, particularly between about 1 and about 7 parts, and more particularly between about 1 and about 5 parts.

The monomer composition of the acrylic-based assembly layer may also include a vinyl ester, and particularly a $C_1$ to $C_{10}$ vinyl ester. An example of commercially available suitable vinyl esters include, but are not limited to: vinyl acetate, VeOVA 9 or VeOVA 10, available from Momentive Specialty Chemicals, located at New Smyrna Beach, Fla. The vinyl ester is typically added to the monomer mixtures in an amount of between about 1 parts and about 20 parts by weight, particularly between about 1and about 15 parts, and more particularly between about 1 and about 10 parts. Other monomers, such as styrenic monomers may also be used.

In one embodiment, a free-radical generating initiator is included in the composition. Examples of free-radical generating initiators include, but are not limited to, thermal or photoinitiators. Examples of thermal initiators include, but are not limited to, peroxides such as benzoyl peroxide and its derivatives or azo compounds. An example of a commercially available azo compound includes VAZO 67, available from E. I. du Pont de Nemours and Co. located in Wilmington, Del., which is 2,2'-azobis-(2-methylbutyronitrile). A variety of peroxide or azo compounds are available that can be used to initiate thermal polymerization at a wide variety of temperatures. A photoinitiator may also be used, either replacing the thermal initiator or used in combination with the thermal initiator. Particularly useful photoinitiators include, but are not limited to, IRGACURE 819, IRGACURE 651 and Darocur 1173, all available from BASF, located in Tarrytown, N.Y. The initiators are typically added to the precursor mixtures in an amount of between about 0.01 parts to about 2 parts by weight, particularly between about 0.02 and about 1 parts, and more particularly between about 0.02 and about 0.5 parts.

In one embodiment, the monomer mixture includes a multifunctional cross-linker. For example, the precursor mixture may include thermal cross-linkers which are activated during the drying step of preparing solvent coated adhesives and cross-linkers that copolymerize during the polymerization step. Such thermal cross-linkers may include, but are not limited to: multifunctional isocyanates, multi-functional aziridines, and epoxy compounds. Exemplary cross-linkers which can be copolymerized include difunctional acrylates such as 1,6-hexanediol diacrylate or multifunctional acrylates such as are known to those of skill in the art. Other useful cross-linkers which can be incorporated during polymerization include, but are not limited to, (meth)acrylate terminated compounds such as urethane di(meth)acrylates, polyether di(meth)acrylates, polyester di(meth)acrylates, and epoxy di(meth)acrylates to create a cross-linked network. Exemplary commercially available cross-linkers which can be copolymerized include, but are not limited to: EBECRYL 270, EBECRYL 8402, EBECRYL 8807, or EBECRYL 230 from Allnex, Brussels, BE; and CN9XX or CN9XXX series aliphatic urethane (meth)acrylates from Sartomer, Exton, Pa. Additional useful di(meth)acrylate cross-linkers include UX-0937, UX3204, UXF4002, and UXT-6000, available from Nippon Kayaku, Tokyo, JP; U-PiCA 8965, 8966 or 8967 urethane di(meth)acrylates from Japan U-PiCa Company, Tokyo, JP; or ART RESIN urethane (meth)acrylate oligomers from Negami Chemical Industrial Company, Nomi-city, Japan.

Useful isocyanate cross-linkers include, for example, an aromatic triisocyanate available as DESMODUR N3300 from Bayer, located in Cologne, Germany. Ultraviolet, or "UV" activated cross-linkers can also be used to crosslink the precursors of the assembly layer. Such UV cross-linkers may include non-copolymerizable photocrosslinkers, such as benzophenones and copolymerizable photocrosslinkers such as acrylated or methacrylated benzophenones like 4-acryloxybenzophenones. Typically, the cross-linker, if present, is added to the monomer mixture in an amount of between about 0.01 parts and about 5 parts by weight based, particularly between about 0.01 and about 4 parts, and more particularly between about 0.01 and about 3 parts. Other crosslinking methods, such as ionic crosslinking, acid-base crosslinking, or the use of physical crosslinking methods, such as by copolymerizing high Tg macromers, such as, for example, polymethylmethacrylate macromere or polystyrene macromer, may also be used. When included, macromers may be used in an amount of about 1 to about 20 parts by weight of the total monomer components in the assembly layer composition.

The assembly layer may be inherently tacky. If desired, tackifiers can be added to the precursor mixture before formation of the assembly layer. Useful tackifiers include, for example: rosin ester resins, aromatic hydrocarbon resins, aliphatic hydrocarbon resins, terpene, and terpene phenolic resins. In general, light-colored tackifiers selected from hydrogenated rosin esters, terpenes, or aromatic hydrocarbon resins are preferred. When included, the tackifier is added to the precursor mixture in an amount of between about 1 parts and about 50 parts by weight, more particularly between about 5 and about 45 parts, and most particularly between about 10 and about 30 parts.

In one embodiment, the acrylic-based assembly layer may be substantially free of acid to eliminate indium tin oxide (ITO) and metal trace corrosion that otherwise could damage touch sensors and their integrating circuits or connectors. "Substantially free" as used in this specification means less than about 2 parts by weight, particularly less than about 1 parts, and more particularly less than about 0.5 parts.

Other materials can be added to the monomer mixture for special purposes, including, for example: molecular weight control agents, coupling agent, oils, plasticizers, antioxidants, UV stabilizers, UV absorbers, pigments, curing agents, polymer additives, nanoparticles, and other additives. In cases where the assembly layer needs to be optically clear, other materials can be added to the monomer mixture, provided that they do not significantly reduce the optical clarity of the assembly layer after polymerization and coating. As used herein, the term "optically clear" refers to a material that has a luminous transmission of greater than about 90 percent and a haze of less than about 5 percent, and particularly less than about 2 percent, in the 400 to 700 nm wavelength range. Both the luminous transmission and the haze can be determined using, for example, ASTM-D 1003-92. Typically, the optically clear assembly layer is visually free of bubbles.

The assembly layer monomeric components can be blended into a precursor mixture. This precursor mixture can be pre-polymerized by exposure to heat or actinic radiation (to decompose initiators in the mixture). This can be done prior to the addition of a cross-linker and other components to form a coatable syrup to which, subsequently, one or more cross-linkers, other additives, and additional initiators can be added. The compounded syrup is then coated on a liner or directly on a substrate and completely polymerized under inert atmosphere by additional exposure to UV. Alternatively, the cross-linker, optional additives, and initiators can be added to monomers and the mixture can be both polymerized and cured in one step (for example, as a liquid OCA). The desired coating method and viscosity will determine which procedure is used.

In another process, the assembly layer monomeric components can be blended with a solvent to form a mixture. The mixture can be polymerized by exposure to heat or actinic radiation (to decompose initiators in the mixture). A cross-linker and additional additives such as tackifiers and plasticizers may be added to the solvated polymer which may then be coated on a liner and run through an oven to dry off solvent to yield the coated adhesive film. Solventless polymerization methods, such as the continuous free radical polymerization method described in U.S. Pat. Nos. 4,619,979 and 4,843,134 (Kotnour et al.); the essentially adiabatic polymerization methods using a batch reactor described in U.S. Pat. No. 5,637,646 (Ellis); and the methods described for polymerizing packaged pre-adhesive compositions described in U.S. Pat. No. 5,804,610 (Hamer et al.) may also be utilized to prepare the polymers.

The disclosed compositions or precursor mixtures may be coated by any variety of techniques known to those of skill in the art, such as roll coating, spray coating, knife coating, die coating, and the like. Alternatively, the precursor composition may also be delivered as a liquid to fill the gap between the two substrates and subsequently be exposed to heat or UV to polymerize and cure the composition in between the two substrates.

The present invention also provides laminates including the assembly layer. A laminate is defined as a multi-layer composite of at least one assembly layer sandwiched between two flexible substrate layers or multiples thereof. For example the composite can be a 3 layer composite of substrate/assembly layer/substrate; a 5-layer composite of substrate/assembly layer/substrate/assembly layer/substrate, and so on. The thickness, mechanical, electrical (such as dielectric constant), and optical properties of each of the flexible assembly layers in such multi-layer stack may be the same but they can also be different in order to better fit the design and performance characteristics of the final flexible device assembly. The laminates have at least one of the following properties: optical transmissivity over a useful lifetime of the article in which it is used, the ability to maintain a sufficient bond strength between layers of the article in which it is used, resistance or avoidance of delamination, and resistance to bubbling over a useful lifetime. The resistance to bubble formation and retention of optical transmissivity can be evaluated using accelerated aging tests. In an accelerated aging test, the acrylic-based assembly layer is positioned between two substrates. The resulting laminate is then exposed to elevated temperatures often combined with elevated humidity for a period of time. Even after exposure to elevated temperature and humidity, the laminate, including the assembly layer, will retain optical clarity. For example, the assembly layer and laminate remain optically clear after aging at 70° C. and 90% relative humidity for approximately 72 hours and subsequently cooling to room temperature. After aging, the average transmission of the adhesive between 400 nanometers (nm) and 700 nm is greater than about 90% and the haze is less than about 5% and particularly less than about 2%.

In use, the assembly layer will resist fatigue over thousands of folding cycles over a broad temperature range from well below freezing (i.e., −30 degrees C., −20 degrees C., or −10 degrees C.) to about 70, 85 or even 90° C. In addition, because the display incorporating the assembly layer may be sitting static in the folded state for hours, the assembly layer has minimal to no creep, preventing significant deformation of the display, deformation which may be only partially recoverable, if at all. This permanent deformation of the assembly layer or the panel itself could lead to optical distortions or Mura, which is not acceptable in the display industry. Thus, the assembly layer is able to withstand considerable flexural stress induced by folding a display device as well as tolerating high temperature, high humidity (HTHH) testing conditions. Most importantly, the assembly layer has exceptionally low storage modulus and high elongation over a broad temperature range (including well below freezing; thus, low glass transition temperatures are preferred) and are cross-linked to produce an elastomer with little or no creep under static load.

During a folding or unfolding event, it is expected that the assembly layer will undergo significant deformation and cause stresses. The forces resistant to these stresses will be in part determined by the modulus and thickness of the layers of the folding display, including the assembly layer. To ensure a low resistance to folding as well as adequate performance, generation of minimal stress and good dissipation of the stresses involved in a bending event, the acrylic-based assembly layer has a sufficiently low storage or elastic modulus, often characterized as shear storage modulus (G'). To further ensure that this behavior remains consistent over the expected use temperature range of such devices, there is minimal change in G' over a broad and relevant temperature range. In one embodiment, the relevant temperature range is between about −30° C. to about 90° C. In one embodiment, the shear modulus is less than about 2 MPa, particularly less than about 1 MPa, more particularly less than about 0.5 MPa, and most particularly less than about 0.3 MPa over the entire relevant temperature range. Therefore, it is preferred to position the glass transition temperature (Tg), the temperature at which the material transitions to a glassy state, with a corresponding change in G' to a value typically greater than about $10^7$ Pa, outside and below this relevant operating range. As used herein, the term "glass transition temperature" or "Tg" refers to the temperature at which a polymeric material transitions from a glassy state (e.g., brittleness, stiffness, and rigidity) to a rubbery state (e.g., flexible and elastomeric). The Tg can be determined, for example, using a technique such as Dynamic Mechanical Analysis (DMA). In one embodiment, the Tg of the assembly layer in a flexible display is less than about −20° C., particularly less than about −30° C., more particularly less than about −40° C. and even more particularly less than about −45° C.

The assembly layer is typically coated at a dry thickness of less than about 300 microns, particularly less than about 100 microns, particularly less than about 50 microns, particularly less than about 20 microns, more particularly less than about 10 microns, and most particularly less than about 5 microns. The thickness of the assembly layer may be optimized according to the position in the flexible display device. Reducing the thickness of the assembly layer may be preferred to decrease the overall thickness of the device as well as to minimize buckling, creep, or delamination failure of the composite structure.

The ability of the assembly layer to absorb the flexural stress and comply with the radically changing geometry of a bend or fold can be characterized by the ability of such a material to undergo high amounts of strain or elongation under relevant applied stresses.

This compliant behavior can be probed through a number of methods, including a conventional tensile elongation test as well as a shear creep test. In one embodiment, in a shear creep test, the acrylic-based assembly layer exhibits a shear creep compliance (J) of at least about $6\times10^{-6}$ 1/Pa, particularly at least about $20\times10^{-6}$ 1/Pa, about $50\times10^{-6}$ 1/Pa, and more particularly at least about $90\times10^{-6}$ 1/Pa under an applied shear stress of between from about 5 kPa to about 500 kPa, particularly between about 20 kPa to about 300 kPa, and more particularly between about 20 kPa to about 200 kPa. The test is normally conducted at room temperature but could also be conducted at any temperature relevant to the use of the flexible device.

The assembly layer also exhibits relatively low creep to avoid lasting deformations in the multilayer composite of a display following repeated folding or bending events. Material creep may be measured through a simple creep experiment in which a constant shear stress is applied to a material for a given amount of time. Once the stress is removed, the recovery of the induced strain is observed. In one embodiment, the shear strain recovery within 1 minute after removing the applied stress (at least one point of applied shear stress within the range of about 5 kPa to about 500 kPa) at room temperature is at least about 50%, particularly at least about 60%, about 70% and about 80%, and more particularly at least about 90% of the peak strain observed at the application of the shear stress. The test is normally conducted at room temperature but could also be conducted at any temperature relevant to the use of the flexible device.

Additionally, the ability of the assembly layer to generate minimal stress and dissipate stress during a fold or bending event is critical to the ability of the acrylic-based assembly layer to avoid interlayer failure as well as its ability to protect the more fragile components of the flexible display assembly. Stress generation and dissipation may be measured using a traditional stress relaxation test in which a material is forced to and then held at a relevant shear strain amount. The amount of shear stress is then observed over time as the material is held at this target strain. In one embodiment, following about 500% shear strain, particularly about 600%, about 700%, and about 800%, and more particularly about 900% strain, the amount of residual stress (measured shear stress divided by peak shear stress) observed after 5 minutes is less than about 50%, particularly less than about 40%, about 30%, and about 20%, and more particularly less than about 10% of the peak stress. The test is normally conducted at room temperature but could also be conducted at any temperature relevant to the use of the flexible device.

As an assembly layer, the assembly layer must adhere sufficiently well to the adjacent layers within the display assembly to prevent delamination of the layers during the use of the device that includes repeated bending and folding actions. While the exact layers of the composite will be device specific, adhesion to a standard substrate such as PET may be used to gauge the general adhesive performance of the assembly layer in a traditional 180 degree peel test mode. The adhesive may also need sufficiently high cohesive strength, which can be measured, for example, as a laminate of the assembly layer material between two PET substrates in a traditional T-peel mode.

When the assembly layer is placed between two substrates to form a laminate and the laminate is folded or bent and held at a relevant radius of curvature, the laminate does not buckle or delaminate between all use temperatures ($-30°$ C. to $90°$ C.), an event that would represent a material failure in a flexible display device. In one embodiment, a multilayer laminate containing the acrylic-based assembly layer does not exhibit failure when placed within a channel forcing a radius of curvature of less than about 200 mm, less than about 100 mm, less than about 50 mm, particularly less than about 20 mm, about 10 mm, and about 5 mm, and more particularly less than about 2 mm over a period of about 24 hours. Furthermore, when removed from the channel and allowed to return from the bent orientation to its previously flat orientation, a laminate including the acrylic-based assembly layer of the present invention does not exhibit lasting deformation and rather rapidly returns to a flat or nearly flat orientation. In one embodiment, when held for 24 hours and then removed from the channel that holds the laminate with a radius of curvature of particularly less than about 50 mm, particularly less than about 20 mm, about 10 mm, and about 5 mm, and more particularly less than about 3 mm, the composite returns to a nearly flat orientation where the final angle between the laminate, the laminate bend point and the return surface is less than about 50 degrees, more particularly less than about 40 degrees, about 30 degrees, and about 20 degrees, and more particularly less than about 10 degrees within 1 hour after the removal of the laminate from the channel. In other words, the included angle between the flat parts of the folded laminate goes from 0 degrees in the channel to an angle of at least about 130 degrees, particularly more than about 140 degrees, about 150 degrees, and about 160 degrees, and more particularly more than about 170 degrees within 1 hour after removal of the laminate from the channel. This return is preferably obtained under normal usage conditions, including after exposure to durability testing conditions.

In addition to the static fold testing behavior described above, the laminate including first and second substrates bonded with the assembly layer does not exhibit failures such as buckling or delamination during dynamic folding simulation tests. In one embodiment, the laminate does not exhibit a failure event between all use temperatures ($-30°$ C. to $90°$ C.) over a dynamic folding test in free bend mode (i.e. no mandrel used) of greater than about 10,000 cycles, particularly greater than about 20,000 cycles, about 40,000 cycles, about 60,000 cycles, and about 80,000 cycles, and more particularly greater than about 100,000 cycles of folding with a radius of curvature of less than about 50 mm, particularly less than about 20 mm, about 10 mm, and about 5 mm, and more particularly less than about 3 mm.

To form a flexible laminate, a first substrate is adhered to a second substrate by positioning the assembly layer of the present invention between the first substrate and the second substrate. Additional layers may also be included to make a multi-layer stack. Pressure and/or heat is then applied to form the flexible laminate.

In one embodiment, the assembly layer should have a dielectric constant of less than about 5, particularly less than about 4.5, more particularly less than about 4.0, and even more particularly less than about 3.5 at a test frequency of 100 kHz. If the dielectric constant is too high, the signal to noise ratio of the touch sensor circuitry becomes impacted. It either results in a loss in touch sensitivity (e.g. false touches or lack of detection in subtle touches) or requires driving a higher voltage across the touch sensor circuit (e.g. requiring a larger battery and/or minimizing battery life between charges).

It is desirable to minimize the change in dielectric constant after exposure to high temperature and high humidity conditions to minimize impact on touch sensitivity. In one embodiment, when the sample is exposed to about $65°$ C. and about 90% relative humidity for about 300 hours, it experiences no more than about a 30%, particularly no more than about a 20% and most particularly no more than about a 10% increase in dielectric constant relative to the ambient equilibrium state (i.e. 23 degrees Celsius/50% relative humidity) when measured at a frequency of 100 kHz within 1 hour of removal from exposure.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following example are on a weight basis.

TABLE 1

Material List

| Acronym | Name | Supplier |
|---|---|---|
| 2-EHA | 2-Ethylhexyl acrylate | Sigma-Aldrich Co., St. Louis, MO |
| IBOA | Isobornyl acrylate | Sartomer, Exton, PA |
| nHA | n-Hexyl acrylate | BASF Corporation, Florham Park, NJ |
| 2ODA | 2-Octyl-1-decyl Acrylate | Prepared following U.S. Pat. No. 8,137,807 |
| DDA | Dodecyl acrylate | Prepared following U.S. Pat. No. 9,399,724 |
| S-1800A | Isostearyl Acrylate | Shin Nakamura Chem. Co., Shanghai, CN |
| AA | Acrylic Acid | Sigma-Aldrich Co., St. Louis, MO |
| HBA | Hydroxybutyl acrylate | TCI America, Portland, OR |
| EB230 | Ebecryl 230 | Allnex, Brussels, BE |
| D1173 | Darocure 1173 | BASF Corporation, Florham Park, NJ |
| I-184 | Irgacure 184 | BASF Corporation, Florham Park, NJ |

Test Method 1. Optical Properties

Haze measurements were made using a HunterLab (Reston, Va.) UltrascanPro Spectrophotometer in transmission mode. The assembly layer was coated between release-coated carrier liners (RF02N and RF22N, SKC Haas, Korea) and was cut to approximately 5 cm width by 10 cm length and their thickness was measured. One of the carrier liners was removed and the sample was laminated to a clear piece of 1 mm thick glass. The other liner was then removed and a second 1 mm thick layer of glass was laminated onto the assembly layer. The sample was placed in the UltrascanPro Spectrophotometer to measure transmission and color through the glass/OCA/glass assembly. Additional samples were prepared and aged in a chamber set to 65° C. and 90% relative humidity for 800 hours. After samples were removed from the humidity chamber and allowed to cool, haze measurements were again conducted. Typically, samples acceptable for optical applications will have haze values of less than about 5%, particularly less than about 2% and b* color values of less than about 5.

Test Method 2. Dynamic Mechanical Analysis

Dynamic mechanical analysis was used to probe the modulus as a function of temperature as well as to determine the glass transition temperature ($T_g$) of the material. An 8 mm diameter by about 1 mm thick disk of the assembly layer was placed between the probes of a DHR parallel plate rheometer (TA Instruments, New Castle, Del.). A temperature scan was performed by ramping from −45° C. to 50° C. at 3° C./min. During this ramp, the samples was oscillated at a frequency of 1 Hz and a strain of approximately 0.4%. The shear storage modulus (G') was recorded at selected key temperatures. The $T_g$ of the material was also determined as the peak in the tan delta vs. temperature profile. To ensure sufficient compliance of the assembly material over the typical range of use temperatures, it is preferred to have the shear storage modulus below about 2 MPa over the entire temperature range from about −20° C. to about 40° C. when measured using the test described above.

Test Method 3. Creep Test

The assembly layer samples were subjected to a creep test by placing a 8 mm diameter by 1.0 mm thick disk in a DHR rheometer equipped with 8 mm test fixture and Peltier temperature control base, and applying a shear stress of 95 kPa for 5 seconds at which time the applied stress was removed and the sample was allowed to recover in the fixture for about 60 seconds. The peak shear strain at 5 seconds after the load was applied and the amount of strain recovery 60 seconds after the load was removed were recorded. The shear creep compliance, J, at any time following the application of the stress is defined as the ratio of the shear strain at that time divided by the applied stress. The shear creep compliance (J) was recorded 5 seconds after the application of the load stress. To ensure sufficient compliance within the assembly layer, it is preferred that the peak shear strain after applying the load in the test described above is greater than about 200% and the compliance J is not less than $1*10^{-6}$ (1/Pa). Furthermore, to minimize material creep within the flexible assembly, it is preferred that the material recover greater that about 50% strain 60 seconds after the applied stress is removed. The percent recoverable strain is defined as $((S_1-S_2)/S_1)*100$ where $S_1$ is the shear strain recorded at the peak at 5 seconds after applying the stress and $S_2$ is the shear strain measured at 60 seconds after the applied stress is removed.

Test Method 4. Dielectric Constant Measurement

The OCA contains 2 liners; a tight liner on one side and easy release liner on the opposite side. A circular sample is then cut from the OCA using a 40 mm diameter dinking die and manual press. The easy release liner is then taken off the cut OCA sample. Then the sample is rolled onto a polished brass disk (d=40 mm, t=2 mm) using a small hand roller. The tight liner is then peeled off the OCA and a second polished brass disk, of the same size, is laid on top of the exposed adhesive. The brass/OCA/brass assembly is then pressed firmly together using finger tips.

The frequency dependent dielectric measurements are performed with a Novocontrol Alpha concept temperature controlled broadband dielectric spectrometer measurement system. The sample cell, Novocontrol model BDS 1200 accommodates the polished brass parallel plate OCA sandwich of 40 mm diameter. The BDS1200 sample cell is internally interfaced to the Alpha-A mainframe. The complex permittivity (dielectric constant and loss) is computed from the phase sensitive measurement of the electrodes voltage difference (Vs) and current (Is). The Novocontrol Dielectric Spectrometer Alpha Analyzer, is designed in accordance with the ASTM D150.

Test Method 5. Static Folding Test

A 100 μm thick section of assembly layer was laminated between 50 μm sheets of polyimide (PI) to make a 3-layer construction and then cut to dimensions of 25.4 mm wide by approximately 125 mm in length. The samples were then placed in either a constrained or unconstrained jig that induced a bend radius of 3 mm or 5 mm for 24 hours at −20° C. For the constrained jig, composites strips were taped to each side of the open jig with 3 pieces of 1 cm wide Scotch double sided tap (3M, St. Paul, Minn.) placed 1 cm apart. The constrained jig was allowed to equilibrate at −20° C. in the open position and then closed for 24 hours at −20° C. For the unconstrained jig, composite samples and the jig were allowed to equilibrate at −20° C. and then composite samples were placed into the well of the jig, forcing them to bend at the specified radius. After 24 hours the samples were removed from the −20° C. environment, removed from each jig, and observed to have passed the static hold test if exhibiting no buckling or delamination of the composite structure.

Examples 1-4 and Comparative Examples 1-3: Preparation of Solventless Based Assembly Layer Samples Assembly layer films were also prepared according to the formulations provided in Table 2 using the following procedure provided in detail for Comparative Example 1. In a clear glass jar, 80 g of HA, 20 g of HBA and 0.04 g of D1173 photoinitiator were mixed. The sample was purged with nitrogen for 5 minutes and exposed to low intensity (0.3 mW/cm$^2$) UV from a 360 nm LED light until a coatable viscosity (~2000 cPs) was achieved. The polymerization was halted by turning off the LED light and purging with air. An additional 0.25 g of D1173 photoinitiator and 0.75 g of EB230 crosslinker was then added to the formulation as indicated in Table 3 and mixed overnight. The viscous polymer solution was then coated between siliconized polyester release liners, RF12N and RF22N (SKC Haas, Korea), using a knife coater with a set gap to yield an OCA coating thickness of 100 μm unless otherwise specified. This construction was then irradiated with a blacklight lamp with a total dose of 1200 mJ/cm$^2$ of UV-A. Examples 1-4 and Comparative Examples 2 and 3 were made in a similar manner using the materials and amounts described in Table 2.

TABLE 2

Preparation of Solventless Based Assembly Layer Samples.

| | Preparation of Coatable Syrup | | | | | | | | Post Syrup Addition | | |
|---|---|---|---|---|---|---|---|---|---|---|---|
| Example | DDA g | 2ODA g | S1800 | 2EHA | HA g | IBOA g | HBA g | AA | D1173 g | D1173 g | EB230 g |
| CE1 | | | | | 80 | | 20 | | 0.03 | 0.25 | 0.75 |
| E1 | | 45 | | 45 | | 10 | | | 0.03 | 0.25 | 0.75 |
| E2 | 90 | | | | | | 10 | | 0.03 | 0.25 | 0.75 |
| E3 | 88 | | | | | | 10 | 2 | 0.03 | 0.25 | 0.75 |
| E4 | | 58 | | 29 | | | 10 | 3 | 0.03 | 0.25 | 0.75 |
| CE2 | | | 45 | 45 | | 10 | | | 0.03 | 0.25 | 0.75 |
| CE3 | | | 58 | 29 | | | 10 | 3 | 0.03 | 0.25 | 0.75 |

In Table 2 above, Comparative Example 1 above utilizes an alkyl acrylate with a relatively short alkyl side chain (C6-hexyl acrylate). Conversely, Examples 1-4 utilizes alkyl acrylates with relatively long alkyl side chains (C12-DDA, C18-2ODA) with low homopolymer glass transition temperature and storage modulus at low temperatures. Finally, Comparative Examples 2 and 3 utilize alkyl acrylates with relatively long alkyl side chains (C18-S1800) with moderately high homopolymer glass transition temperatures and storage modulus at low temperatures.

TABLE 3

Mechanical, Electrical, and Folding Properties of OCA Examples and C. Examples

| | Mechanical | | | Optical | | | Static Fold Testing @ −20° C. | | | |
|---|---|---|---|---|---|---|---|---|---|---|
| | | −25° C. | | Recovery | Haze | Electrical | Constrained to Sides of Fold Apparatus | | Unconstrained to Sides of Fold Apparatus | |
| | Tg | G' | J | @ 60 s | Initial | EPS'@ | | | | |
| Example | C. | MPa | MPa * s | % | % | 10^5 Hz | r = 3 mm | r = 5 mm | r = 3 mm | r = 5 mm |
| CE1 | −46 | 0.15 | 1.10E−4 | 89 | 0.23 | 5.35 | Pass | Pass | Pass | Pass |
| E1 | <−50 | 0.06 | 2.08E−4 | 57 | 0.21 | 3.50 | Pass | Pass | Pass | Pass |
| E2 | −39 | 0.13 | 1.25E−4 | 78 | 0.21 | 3.95 | Pass | Pass | Pass | Pass |
| E3 | −32 | 0.34 | 1.16E−4 | 81 | 0.2 | 3.95 | Pass | Pass | Pass | Pass |
| E4 | −35 | 0.19 | 1.15E−4 | 69 | 0.22 | 3.95 | Pass | Pass | Pass | Pass |
| CE2 | −25 | 8.30 | 1.02E−4 | 87 | 0.20 | 3.00 | Buckling | Pass | Pass | Pass |
| CE3 | −15 | 114.0 | 4.23E−5 | 98 | 0.21 | 3.10 | Buckling | Buckling | Buckling | Buckling |

As shown above in Table 3, Comparative Example 1 demonstrates desirable mechanical properties that as expected lead to good performance when materials are subjected to a static fold at −20° C. However, Comparative Example 1 does not exhibit the desired low dielectric constant at the given frequency. Examples 1-4 that incorporate monomers with greater alkyl side chain content than Comparative Example 1 demonstrate good folding performance at −20° C. while also exhibiting the desired low dielectric constant. Finally, Comparative Examples 2 and 3 that also incorporate monomers with greater alkyl side chain content than Comparative Example 1 yield a desired low dielectric constant but do not demonstrate favorable performance in the static folding tests at −20° C. due to the unfavorable mechanical properties characteristic of these samples. From these results, an OCA that has both the low dielectric constant and folding performance desired is achieved by incorporating monomers that have a high alkyl side chain component and result in polymers that possess favorable mechanical properties such as a low storage modulus at low temperatures and low glass transition temperature.

Although the present invention has been described with reference to preferred embodiments, workers skilled in the art will recognize that changes may be made in form and detail without departing from the spirit and scope of the invention.

What is claimed is:

1. An assembly layer for a flexible device, wherein the assembly layer is derived from precursors comprising:
    about 0 to about 50 wt % $C_1$-$C_9$ alkyl(meth)acrylate;
    about 40 to about 99 wt % $C_{10}$-$C_{24}$ (meth)acrylate;
    about 0 to about 30 wt % hydroxyl (meth)acrylate;
    about 0 to about 10 wt % of a non-hydroxy functional polar monomer; and
    about 0 to about 5 wt % crosslinker,
    wherein the assembly layer has a dielectric constant (Dk) of less than about 5.0 when measured at a frequency of about 100 kHz, and
    wherein the assembly layer has a glass transition temperature of less than about −30° C.

2. The assembly layer of claim 1, wherein within a temperature range of between about −30° C. to about 90° C., the assembly layer has a shear storage modulus at a frequency of 1 Hz that does not exceed about 2 MPa, a shear creep compliance (J) of at least about $6 \times 10^{-6}$ 1/Pa measured at 5 seconds with an applied shear stress between about 20 kPa and about 200 kPa, and a strain recovery of at least about 50% at at least one point of applied shear stress within the range of about 20 kPa to about 200 kPa, within about 1 minute after removing the applied shear stress.

3. The assembly layer of claim 1, wherein the dielectric constant (Dk) of the assembly layer does not change by more than about 40% of its initial value upon exposure to about 65° C./90% relative humidity conditions for greater than about 400 hours.

4. The assembly layer of claim 1, wherein the flexible device is a flexible electronic display.

5. The assembly layer of claim 1, wherein the assembly layer is optically clear.

6. A laminate comprising:
    a first flexible substrate;
    a second flexible substrate; and
    an assembly layer positioned between and in contact with the first flexible substrate and the second flexible substrate, wherein the assembly layer is derived from precursors that comprise:
        about 0 to about 50 wt % $C_1$-$C_9$ alkyl(meth)acrylate;
        about 40 to about 99 wt % $C_{10}$-$C_{24}$ (meth)acrylate;
        about 0 to about 30 wt % hydroxyl (meth)acrylate;
        about 0 to about 10 wt % of a non-hydroxy functional polar monomer; and
        about 0 to about 5 wt % crosslinker,
        wherein the assembly layer has a dielectric constant (Dk) of less than about 5.0 when measured at a frequency of about 100 kHz, and
        wherein the assembly layer has a glass transition temperature of less than about −30° C.

7. The laminate of claim 6, wherein within a temperature range of between about −30° C. to about 90° C., the assembly layer has a shear storage modulus at a frequency of 1 Hz that does not exceed about 2 MPa, a shear creep compliance (J) of at least about $6 \times 10^{-6}$ 1/Pa measured at 5 seconds with an applied shear stress between about 20 kPa and about 200 kPa, and a strain recovery of at least about 50% at at least one point of applied shear stress within the range of about 20 kPa to about 200 kPa, within about 1 minute after removing the applied shear stress.

8. The laminate of claim 6, wherein at least one of the first and second substrates is optically clear.

9. The laminate of claim 6, wherein the laminate does not exhibit failure when placed within a channel forcing a radius of curvature of less than about 10 mm over a period of 24 hours at room temperature.

10. The laminate of claim 9, wherein the laminate returns to an included angle of at least about 130 degrees after removal from the channel after the 24 hour period at room temperature.

11. The laminate of claim 6, wherein the laminate does not exhibit failure when subjected to a dynamic folding test at room temperature of about 10,000 cycles of folding with a radius of curvature of less than about 10 mm.

12. A method of adhering a first substrate and a second substrate, wherein both of the first and the second substrates are flexible, the method comprising:
    positioning an assembly layer between the first flexible substrate and the second flexible substrate to form a laminate, wherein the assembly layer is derived from precursors that comprise:
        about 0 to about 50 wt % $C_1$-$C_9$ alkyl(meth)acrylate;
        about 40 to about 99 wt % $C_{10}$-$C_{24}$ (meth)acrylate;
        about 0 to about 30 wt % hydroxyl (meth)acrylate;
        about 0 to about 10 wt % of a non-hydroxy functional polar monomer; and
        about 0 to about 5 wt % crosslinker,
        wherein the assembly layer has a dielectric constant (Dk) of less than about 5.0 when measured at a frequency of about 100 kHz, and
        wherein the assembly layer has a glass transition temperature of less than about −30° C.; and
    applying at least one of pressure and heat to form a laminate.

13. The method of claim 12, wherein within a temperature range of between about −30° C. to about 90° C., the assembly layer has a shear storage modulus at a frequency of 1 Hz that does not exceed about 2 MPa, a shear creep compliance (J) of at least about $6 \times 10^{-6}$ 1/Pa measured at 5 seconds with an applied shear stress between about 20 kPa and about 200 kPa, and a strain recovery of at least about 50% at at least one point of applied shear stress within the range of about 20 kPa to about 200 kPa, within about 1 minute after removing the applied shear stress.

14. The method of claim 12, wherein the assembly layer is optically clear.

15. The method of claim 12, wherein the laminate does not exhibit failure when placed within a channel forcing a radius of curvature of less than about 10 mm over a period of 24 hours at room temperature.

16. The method of claim 15, wherein the laminate returns to an included angle of at least about 130 degrees after removal from the channel after the 24 hour period at room temperature.

17. The method of claim 12, wherein the laminate does not exhibit failure when subjected to a dynamic folding test at room temperature of greater than about 10,000 cycles of folding with a radius of curvature of less than about 10 mm.

\* \* \* \* \*